Aug. 16, 1966 W. R. HARMON 3,267,461

MIXED BASE DATA REDUCTION TECHNIQUE

Filed Aug. 26, 1963 6 Sheets-Sheet 1

INVENTOR.
WILLIAM R. HARMON
BY [signature]
ATTY.
[signature]
AGENT

INVENTOR.
WILLIAM R. HARMON
BY [signature] ATTY.
[signature] AGENT

INVENTOR.
WILLIAM R. HARMON
BY D. E. Hodges
ATTY.
Albert Hopp
AGENT

Aug. 16, 1966 W. R. HARMON 3,267,461

MIXED BASE DATA REDUCTION TECHNIQUE

Filed Aug. 26, 1963 6 Sheets-Sheet 4

INVENTOR.
WILLIAM R. HARMON
BY O. E. Hodges ATTY.
Albert Sopp AGENT

INVENTOR.
WILLIAM R. HARMON
BY [signature] ATTY.
[signature] AGENT

Aug. 16, 1966 W. R. HARMON 3,267,461

MIXED BASE DATA REDUCTION TECHNIQUE

Filed Aug. 26, 1963 6 Sheets-Sheet 6

INVENTOR.
WILLIAM R. HARMON
BY [signature] ATTY.
[signature] AGENT

United States Patent Office 3,267,461
Patented August 16, 1966

3,267,461

MIXED BASE DATA REDUCTION TECHNIQUE

William R. Harmon, Burlington, N.C., assignor, by mesne assignments, to the United States of America as represented by the Secretary of the Navy Filed Aug. 26, 1963, Ser. No. 304,702
11 Claims. (Cl. 340—347)

Figures 1, 2:
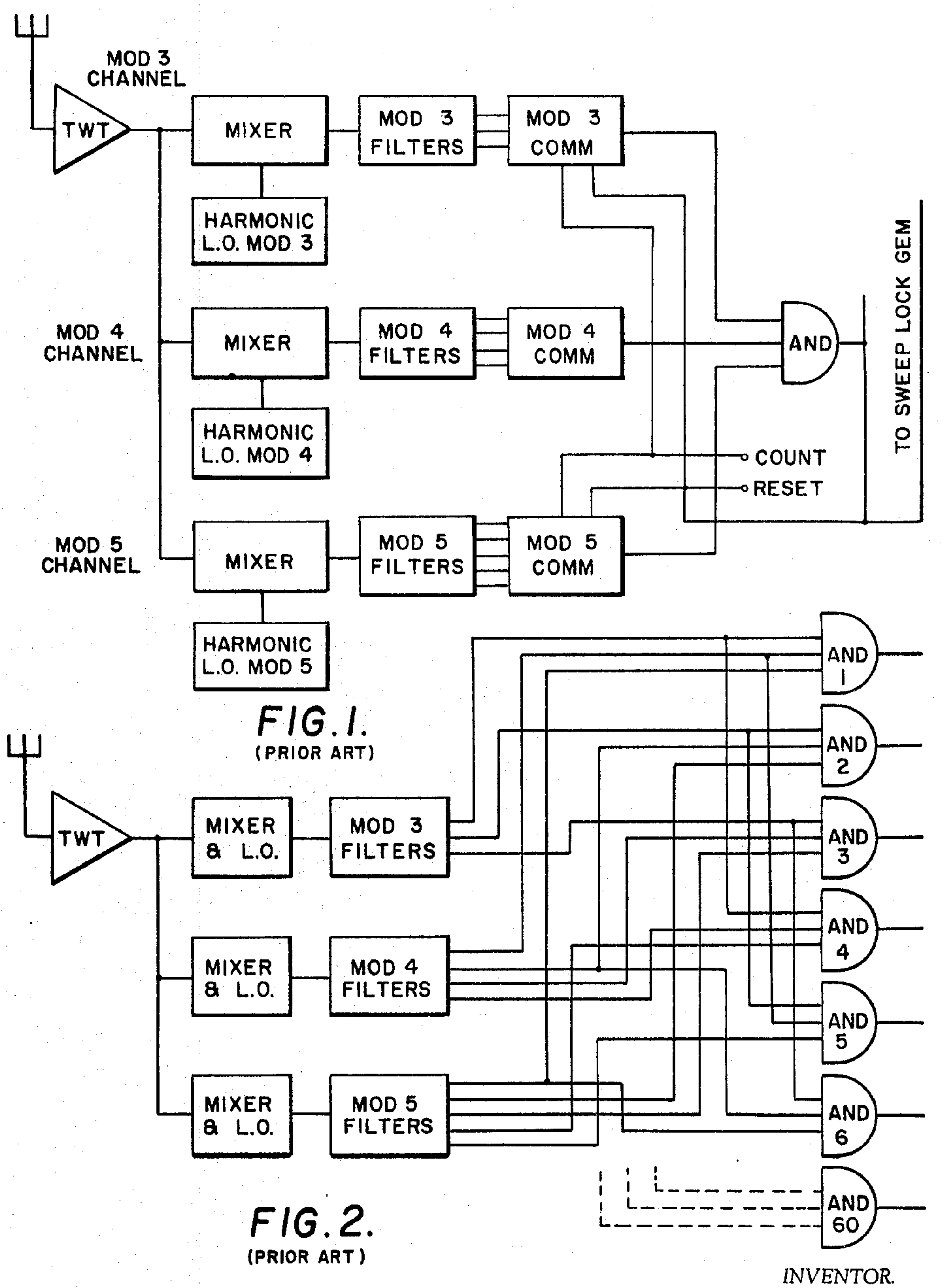

The present invention relates to improved data reduction in receiving systems, and more particularly, relates to a mixed base receiving system having a large number of signal-identifying cells, arranged and controlled to provide improved data reduction of one or more incoming signals without confusion of signal identifying outputs.

It is known that a signal may be expressed as a mixed base digital word with each digit rooted in a different base or modulus (Mod) instead of one or more digits rooted in the same base. For example, a signal represented by the expression "8" in the decimal or base 10 system may be written in the mixed base or Mod 3, 4 system as 2–4; or in the mixed base or Mod 3, 4, 5 system as 2–4–3. The following Table I illustrates the relationship between base 10 expressions and Mod 3, 4 and Mod 3, 4, 5 expressions.

TABLE I

| Decimal Notation | Mixed Base Notation | | |
|---|---|---|---|
| | Modulo 3 | Modulo 4 | Modulo 5 |
| 1 | 1 | 1 | 1 |
| 2 | 2 | 2 | 2 |
| 3 | 3 | 3 | 3 |
| 4 | 1 | 4 | 4 |
| 5 | 2 | 1 | 5 |
| 6 | 3 | 2 | 1 |
| 7 | 1 | 3 | 2 |
| 8 | 2 | 4 | 3 |
| 9 | 3 | 1 | 4 |
| 10 | 1 | 2 | 5 |
| 11 | 2 | 3 | 1 |
| 12 | 3 | 4 | 2 |
| (13) | (1) | (1) | 3 |

A cursory study of the above Table I shows that decimal numbers from 1 to 12 can be written in the mixed base 3, 4 notation without redundance. The decimal 13 when written in mixed base notation 3, 4 is seen to be 1–1, the same as the mixed base notation for the decimal 1. Thus, the addition of unity to each of a series of digits rooted in moduli which are relatively prime in pairs yields a series of non-redundant digital words over a range of values equal to the product of the relatively prime moduli. Thus, $3\times4=12$ is the range of decimal values or cells capable of notation in moduli 3, 4, without redundance.

By similar analysis, the number of non-redundant values in the modulo 3, 4, 5 system is $3\times4\times5=60$. If one were to use relatively non-prime moduli such as 6, 8, 10, the number of non-redundant values or cells is 120—an increase in number of cells comparable with the additional mixed base digits employed, but obviously not equal to the product $6\times8\times10$. Mixed base receiving systems have been devised which considerably reduce the number of filters needed. As shown in FIG. 1, a system has been evolved where there is required only 12 filters instead of 60 filters for the same frequency band of interest. U.S. Patent 3,000,006 may be referred to for a more complete exposition thereof.

In the heretofore evolved system of FIG. 1 there is shown a three channel receiver, the respective channels being labeled "Modulo 3," "Modulo 4" and "Modulo 5." A "Harmonic Local Oscillator" of the "Modulo 3" channel generates an array of harmonically related frequencies separated by 3 mc. When an input carrier somewhere in an exemplary band of interest of 60 mc. is received, it is fed into the "mixer" in the "Modulo 3" channel, the "mixer" output thus being the carrier plus an array of sideband frequencies spaced from each other by increments of 3 mc.

The same input signal is also fed to the channel "Modulo 4," the "harmonic local oscillator" of which generates an array of frequencies separated by 4 mc., and to the "Modulo 5" channel, the "harmonic local oscillator" of which generates an array of frequencies having 5 mc. incremental separation. The resulting sideband frequencies in the "Modulo 4" channel are separated by 4 mc., and the sidebands in the "Modulo 5" channel are separated by 5 mc.

No matter what the frequency of the incoming carrier, the output of each Mod channel mixer will always produce a group of sidebands having intrinsic spacing equal to the channel modulus in mcs.

In the "Modulo 3" channel, a gamut of three parallel slot filters labeled "Mod 3 filters" each accepting an adjacent band of 1 mc., receives the output of the mixer in that channel. Thus, except at exact or gapped cross over points between the filters, one and only one of the three parallel Mod 3 filters will be in an "active" state, indicating the presence of a carrier at a certain frequency, because only one such filter at a time can intercept a sideband.

Similarly, within filter cross-over limitations, only one of four parallel adjacent "Mod 4" 1 mc. slot filters in the Modulo 4 channel will be active in response to that same carrier. And in the Modulo 5 channel, only one of a gamut of five adjacent parallel 1 mc. slot filters labeled "Mod 5 filters" will be active responsive to the presence of the carrier and sideband array.

However, since the sideband spacing is different in each respective channel mixer and since the filter slot acceptance and adjacent relationship are the same in all channels, the sideband which is coincident with any filter gamut may, and often does, fall into a correspondingly different filter of the respective gamuts.

Suppose, for example, at one point in time, filter #3 of the "Mod 3" filter gamut is active in coincidence with filter #1 of the "Mod 4" gamut and filter #4 of the "Mod 5" gamut. At the next point in time, filter #1 of "Mod 3," filter #2 of "Mod 4" and filter #5 of "Mod 5" gamuts respectively are active. Thus, there are generated in succession the following mixed base codes in Mod 3, 4, 5 notation:

3–1–4
1–2–5

Referring to Table I it can be shown that the code 3–1–4 occurs only once within the 60 cell mixed base code 3, 4, 5, and equating code 3–1–4 to a decimal position, it occurs in coincidence to decimal "9." Code 1–2–5 occurs only at decimal "10." Thus, in the example, the incoming carrier must have shifted upwards 1 mc. in frequency.

The combination of active filters in the Modulo 3, 4 and 5 channels has therefore uniquely represented the frequency of the carrier to a resolution of 1 part in 60, or 1 mc. in a 60 mc. band of interest. The activity of the respective filters in each Modulo channel may be translated into any suitable pulse code output by providing a ring counter or commutator (labeled in FIG. 1 "Comm") in each Modulo channel. Appropriate stepping pulses may be applied to each commutator causing successive signal transfer from the filter output leads to an "AND gate." Thus one filter output lead in each Modulo channel is enabled in synchronism with a lead in each of the other Modulo channels in mixed base 3, 4, 5, code correspondence until the 60 unique combinations are exhausted. The system is then reset for another stepped sweep through the band of interest.

Another prior arrangement for producing the 60 discrete mixed base 3, 4, 5, combinations is shown in FIG. 2. For each unique mixed base code there is provided and "AND gate." "AND gate 1" is connected to receive the output from the respective #1 filters of each Modulo filter gamut, so that when carrier activity is present therein, the mixed base 3, 4, 5 code 1–1–1 (see Table I) is produced. "AND gate 2" is connected to the respective #2 filters, and thus produces an output 2–2–2; "AND gate 3" produces 3–3–3; "AND gate 4" produces 1–4–4; "AND gate 5" produces 2–1–5, etc. to "AND gate 60." The 60 code combinations are thus exhausted there being one AND gate for each mixed base number.

In the system of FIG. 2, no synchronization means or stepping means are required in each Modulo channel because each "AND gate" produces a uniquely identifiable output. It is necessary only that the 60 AND gates be swept successively for frequency identification.

A disadvantage in prior systems is that errors may be caused when two incoming carriers are intercepted by a mixed base receiver during a sweep through the entire band. When this happens, several mixed base codes may be generated in the system. For example, referring again to Table I, suppose an incoming carrier of 4 mcs. (corresponding to decimal 4 for purposes of illustration) producing a Mod 3, 4, 5 code of 1–4–4 occurs in the same sweep with an incoming carrier of 3 mcs. producing a mixed base 3, 4, 5 output of 3–3–3.

When the respective modulo filter gamut outputs are swept to determine carrier frequency location, confusion results because the mixed base output code is no longer unique. In the example, the following codes would be produced: 1–4–4; 1–3–4; 1–3–3; 1–4–3; 3–3–3; 3–4–3; 3–3–4; 3–4–4.

Another disadvantage in prior arrangements may be deduced from an analysis of the system depicted in FIG. 2. As previously pointed out, in a 3, 4, 5 mixed base system 60 AND gates are required to provide 60 discrete 3, 4, 5 values or cells. Each AND gate has three inputs and one output.

In general each such AND gate may require 4 diodes, and 60 AND gates require 240 diodes. The system portion shown in FIG. 1 may require elaborate and expensive synchronization and commutating means.

Now in a system having only relatively few cells, the expense of providing such synchronization commutating means, or a relatively large number of AND gates, may not necessarily assume prohibitively great proportions. But in a high resolution system where it may be desired to provide thousands of cells or discrete code values, the elaboration of such means also becomes high in proportion. A thousand cell output would, under the arrangement of FIG. 2, require at least 1000 AND gates, or 4000 diodes. Clearly, as the number of desired output cells increases, the expense of the output data reducing components vastly increases. The requirement of accuracy for synchronization and commutating equipment also becomes high. And as the resolution is improved by the increased number of cells, the more susceptible to ambiguity and multi carrier error does the system become.

Accordingly, it is an object of the present invention to provide in a mixed base receiver an improved data reducing system.

Another object of this invention is an improved data reducing system for a mixed base receiver for reducing ambiguous data corresponding to incoming signal activity and for reducing the production of spurious output data.

Another object of the present invention is the provision in a mixed base receiver of an improved data reduction system incorporating output data selection in accordance with incoming signal activity.

Figure 3:
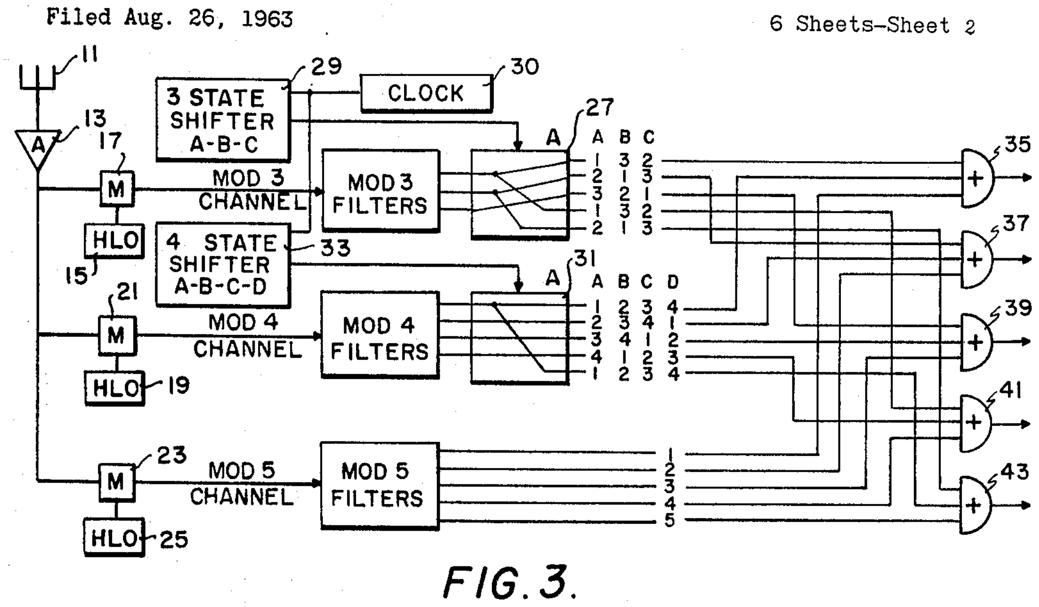
Figure 6:
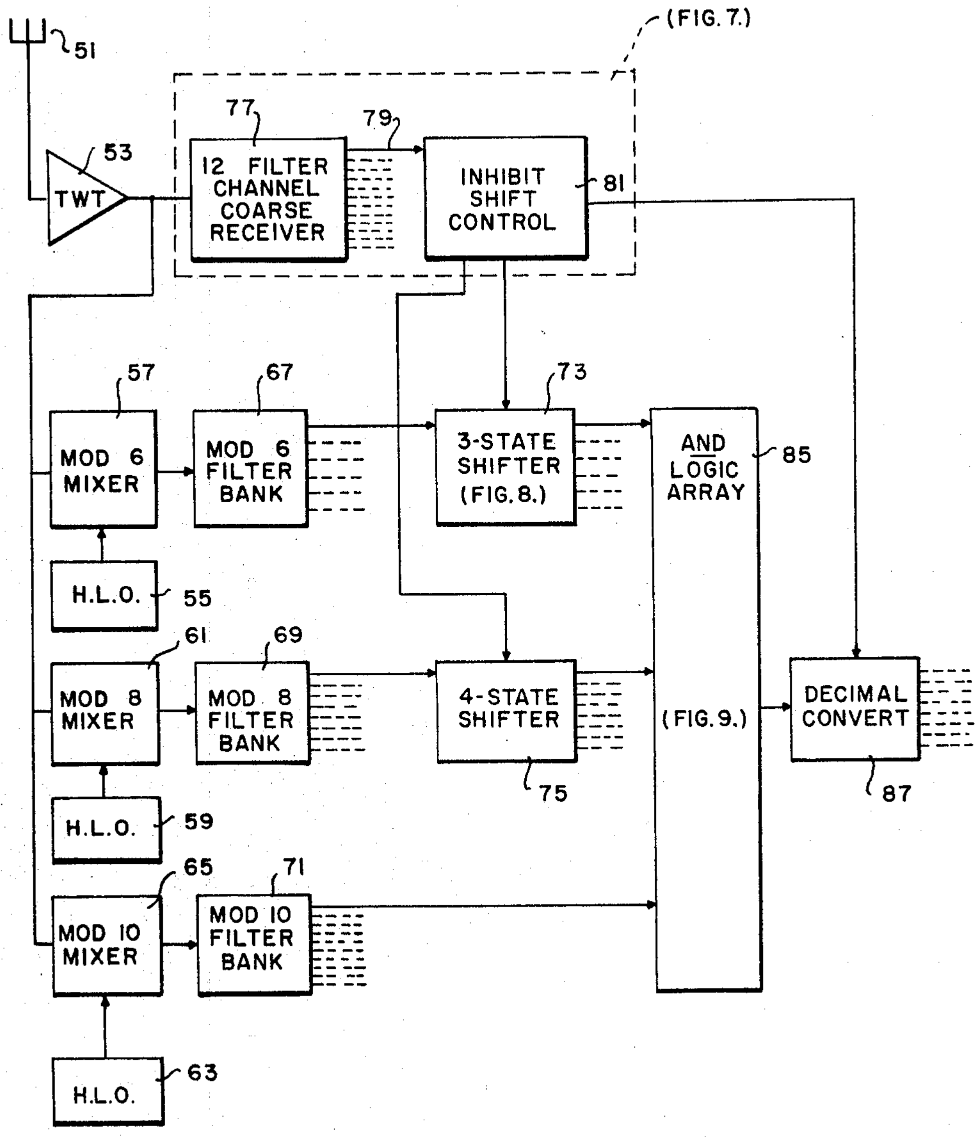
Figure 7:
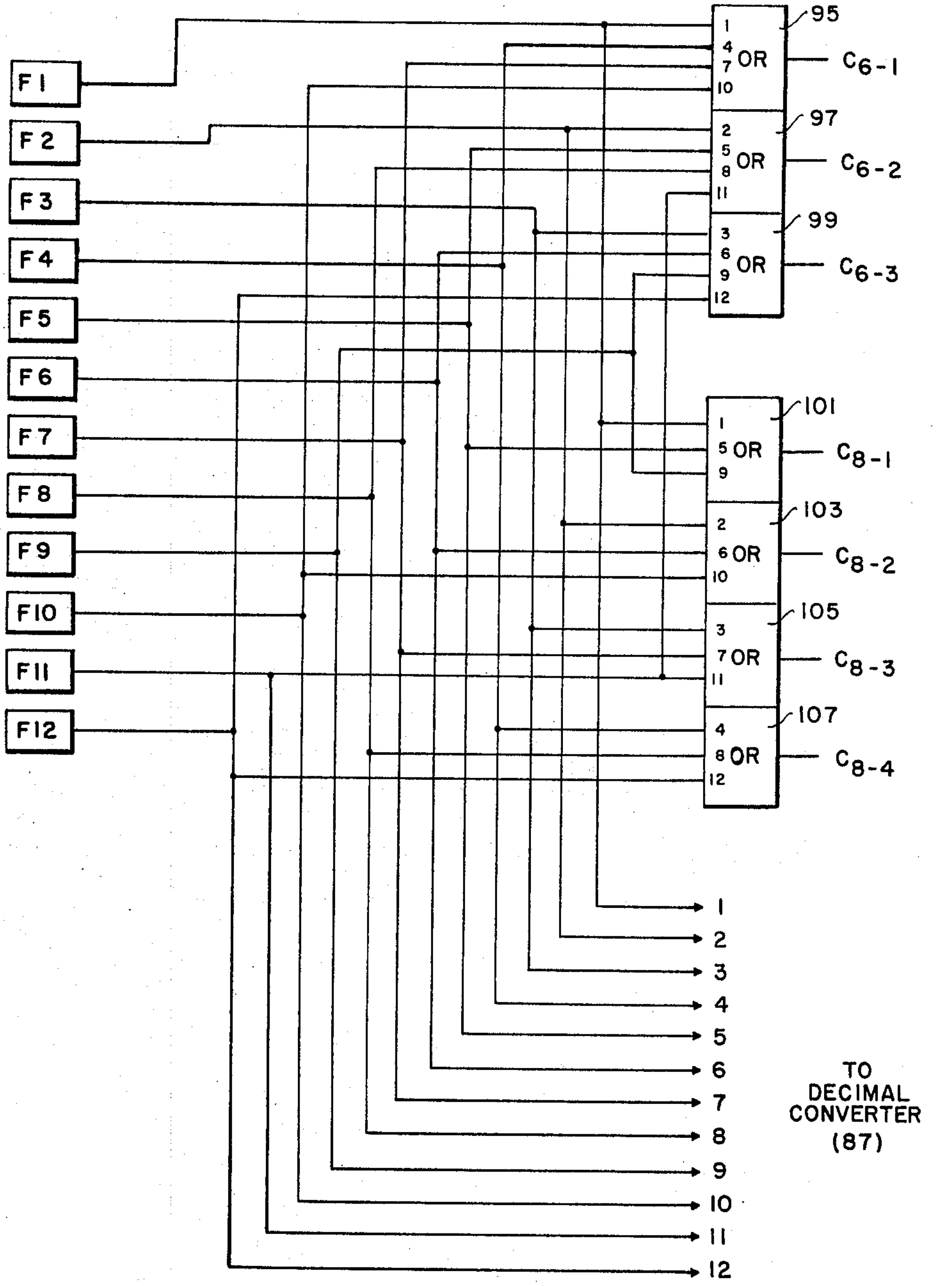
Figure 8:
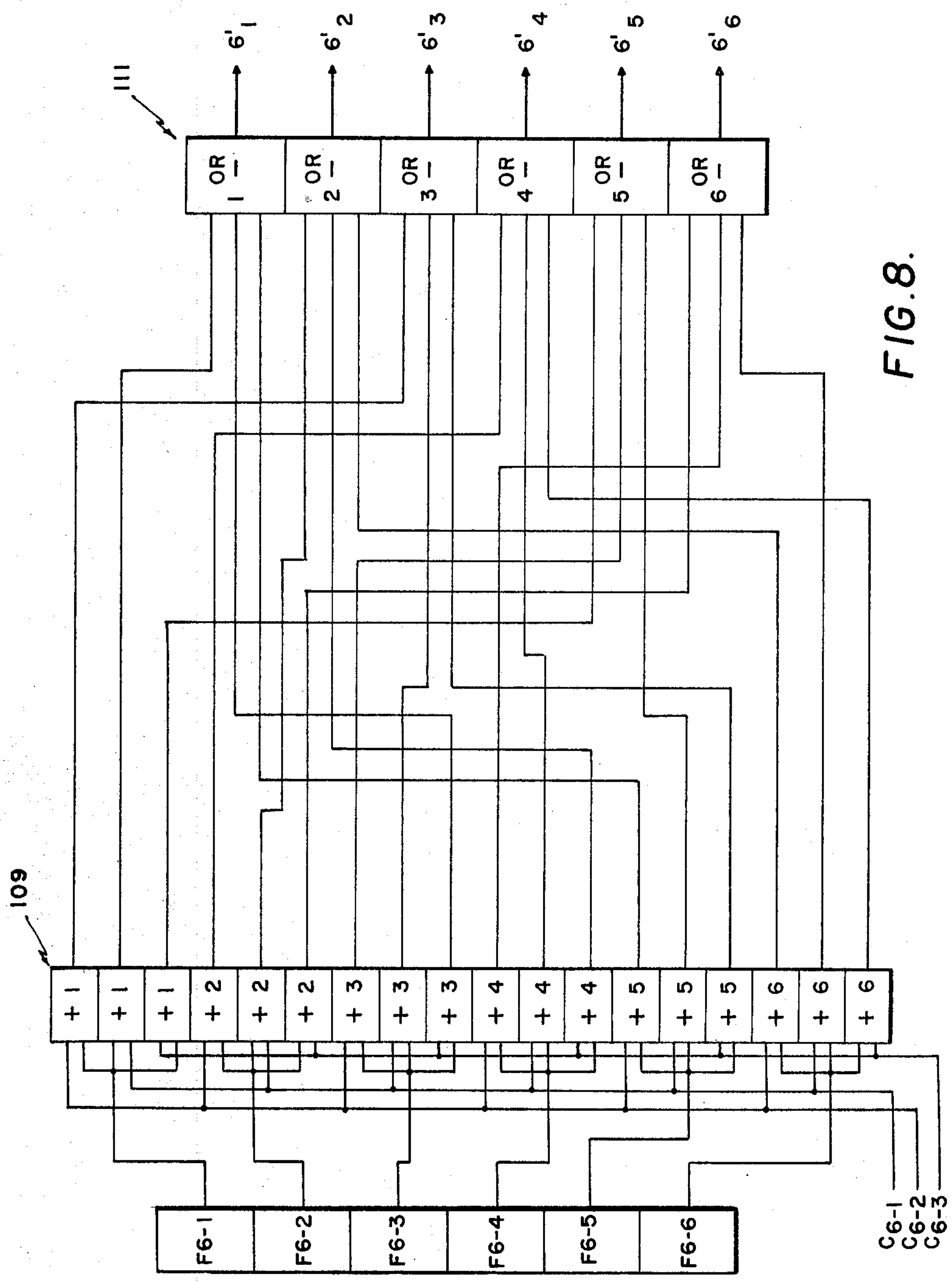
Figure 9:
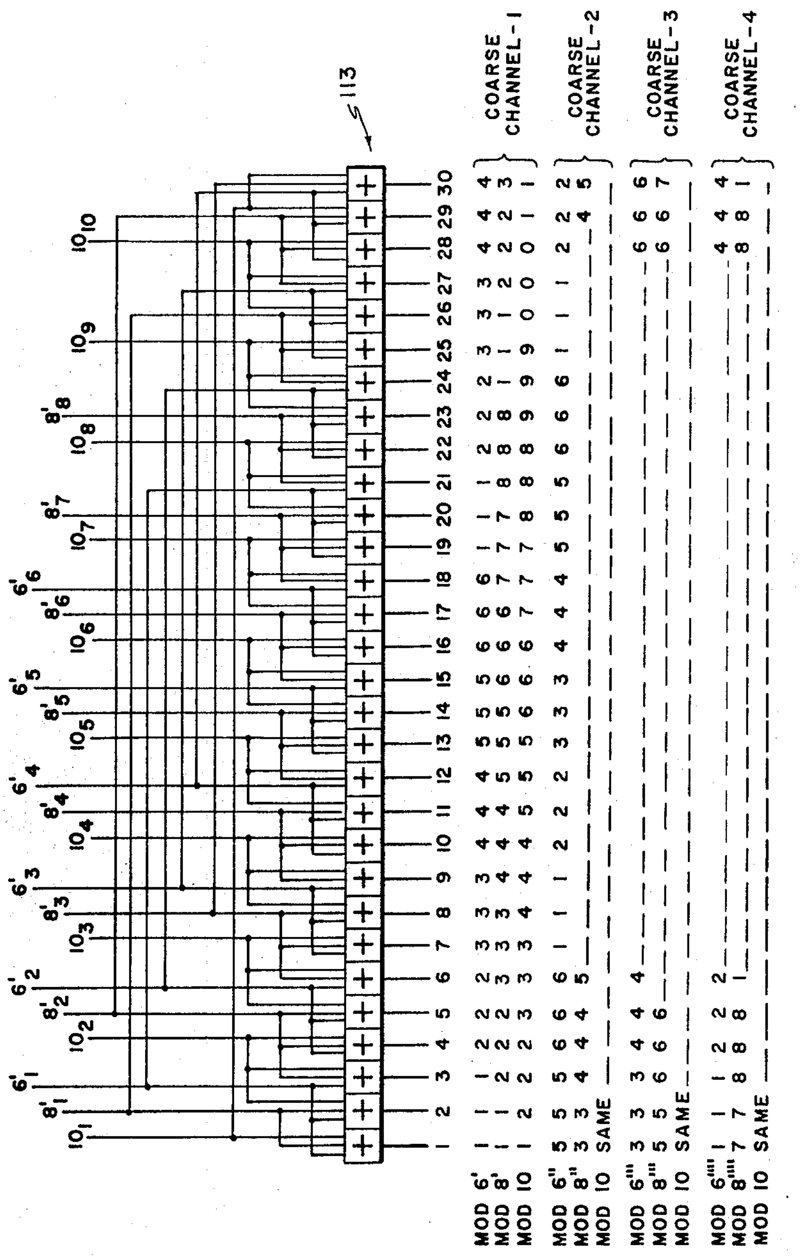

The foregoing objects as well as features and advantages of the present invention will be better understood by reference to the accompanying drawings in which like reference numerals refer to like parts, and in which:

FIGS. 1 and 2, already referred to, are prior art mixed base receiver systems depicted in block diagram form to provide background information in connection with the present invention;

FIG. 3 is a version of the improved data reducing system according to the present invention in conjunction with a mixed base receiver;

FIGS. 4*a*, 4*b*, 4*c*, and 5 are explanatory diagrams to illustrate certain principles of the invention;

FIG. 6 is an illustrative block diagram of a mixed base receiver incorporating the improved data reducing system according to an embodiment of the invention; and FIGS. 7–9 are schematic block diagrams relating to portions of the system of FIG. 6.

In brief, the present invention is primarily concerned with data reduction in high resolution, high cell-capacity mixed base receiver systems to provide multi-carrier discrimination. In carrying out the invention, several known principles must be kept in mind. One such principle is that of staggering or offset. For example, as shown in part in Table II below the relatively prime modulo 3, 4, 5 system may be staggered as follows:

TABLE II

| Cell # | Mod 3 | Mod 4 | Mod 5 |
|---|---|---|---|
| 1 | 1 | 1 | 1 |
| 2 | 2 | 1 | 1 |
| 3 | 2 | 2 | 1 |
| 4 | (2) | 2 | 2 |
| 5 | (3) | 2 | 2 |
| 6 | 3 | 3 | 2 |
| 7 | 3 | 3 | 3 |
| 8 | 1 | 3 | 3 |
| 9 | 1 | 4 | 3 |
| 10 | 1 | 4 | 4 |
| 11 | 2 | 4 | 4 |
| 12 | 2 | 1 | 4 |
| 13 | 2 | 1 | 5 |
| 14 | 3 | 1 | 5 |
| 15 | 3 | 2 | 5 |
| 16 | 3 | 2 | 1 |
| 17 | 1 | 2 | 1 |
| 18 | 1 | 3 | 1 |
| 19 | 1 | 3 | 2 |
| 20 | 2 | 3 | 2 |
| 21 | 2 | 4 | 2 |

The mixed base digits of the array resulting from the offset or staggering of the moduli as shown in Table II are grouped by threes. If each group of three digits is treated as a single cell as indicated, it will be seen that a filtering inaccuracy may cause a change of, say, cell 4 to cell 5 in the Mod 3 digit array. This change is indicated by the circled digits. The advantage of staggering is that error caused by filter crossover inaccuracies is limited to the adjacent cell rather than cells widely spaced apart because from cell to cell only one modulo digit changes its value.

In reducing ambiguity error to adjacent cells, the bandwidth of each Mod filter is made $n$ times the basic cellular bandwidth where $n$ is the number of moduli in the system—3 in the prior systems shown in FIGS. 1 and 2. Thus the bandwidth of each filter in the respective channel filter gamuts described in connection with FIG. 1 would be 3 mcs. Moreover, the respective gamuts of filters of the Mod 3, 4, 5 channels are unidirectionally offset from each other by 1 mc. as can be observed from the resulting staggered Mod 3, 4, 5 cellular array of Table II. The filter offset may be accomplished by heterodyning or by individual filter tuning.

Instead of employing the relatively prime Mod 3, 4, 5 system, a relatively non-prime system such as Mod 6, 8, 10 in the staggered form may be used to obtain 360 discrete cells. Such a system results in the number array the initial portion of which is shown in Table III below:

TABLE III

| Cell # | Mod 6 | Mod 8 | Mod 10 |
|---|---|---|---|
| 1 | 1 | 1 | 1 |
| 2 | 1 | 1 | 2 |
| 3 | 1 | 2 | 2 |
| 4 | 2 | 2 | 2 |
| 5 | 2 | 2 | 3 |
| 6 | 2 | 3 | 3 |
| 7 | 3 | 3 | 3 |
| 8 | 3 | 3 | 4 |
| 9 | 3 | 4 | 4 |
| 10 | 4 | 4 | 4 |
| 11 | 4 | 4 | 5 |
| 12 | 4 | 5 | 5 |
| 13 | 5 | 5 | 5 |
| 14 | 5 | 5 | 6 |
| 15 | 5 | 6 | 6 |
| 16 | 6 | 6 | 6 |
| 17 | 6 | 6 | 7 |
| 18 | 6 | 7 | 7 |
| 19 | 1 | 7 | 7 |
| 20 | 1 | 7 | 8 |
| 21 | 1 | 8 | 8 |
| 22 | 2 | 8 | 8 |

The foregoing offset or staggered cellular number array is provided in a Mod 6, 8, 10 system in the same manner as described in connection with the offset or staggered Mod 3, 4, 5 system—*n* being 3 in both cases.

Referring to FIG. 3, a simplified mixed base 3, 4, 5 receiver according to an embodiment of the invention is illustrated. For purposes of example, the bandwidth of interest is assumed to be 60 mcs.

Figures 4A, 4B, 4C:
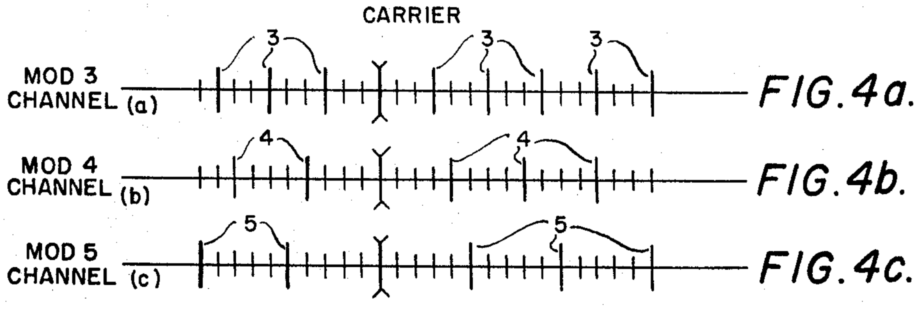

One or more varying frequency carriers are intercepted by an antenna 11 and amplified by a traveling wave tube amplifier 13. The incoming signals are then fed into *n* respective parallel channels—*n* here being 3 channels identified as the Mod 3, Mod 4 and Mod 5 channels. In the same manner as explained in conjunction with the prior art systems of FIGS. 1 and 2, in the Mod 3 channel a harmonic local oscillator 15 generates frequencies spaced apart by 3 mcs. for combination with the incoming signals in a mixer 17 to produce an array or spread of sideband frequencies spaced by increments of 3 mcs. from each other and the carrier frequency at all carrier frequencies. This relationship is shown in FIG. 4*a* which is a graph depicting the sideband frequency array produced by the mixer 17. The numerals 3 in FIG. 4*a* indicate the sideband signal component positions in the Mod 3 sideband frequency array.

In the Mod 4 channel, a harmonic local oscillator 19 generates an array of frequencies spaced apart in 4 mc. increments. The input signal is mixed with the local oscillator frequencies in a mixer 21 to produce a sideband frequency array having sideband signal components (indicated in FIG. 4*b* by the numerals 4) spaced apart in increments of 4 mcs.

In a similar manner, in the Mod 5 channel, a harmonic local oscillator 25 generates signals spaced 5 mcs. apart for mixing with the input signal in a mixer 23. The resulting sideband array of the mixer 23 has sideband components at positions marked "5" in FIG. 4*c*.

Again in the same manner as explained in connection with the prior art systems of FIGS. 1 and 2, the respective gamuts of Mod 3, Mod 4 and Mod 5 filters will each have one and only one active filter in response to the presence of an incoming signal carrier.

The output of each slot filter of the Mod 3 filter gamut is fed to a Mod 3 shift register 27 having three changeably different interconnection states A, B, and C, and 5 outputs. As shown by the exemplary initial "State A" connections, the first and second slot filters of the Mod 3 gamut are respectively connected to the first, second, fourth and fifth outputs of the shift register 27. The third Mod filter is connected to the third shift register output. With the shift register 27 in its initial state A, the outputs thereof represent the first 5 digits of Mod 3, or 1, 2, 3, 1, 2.

By applying to the shift register 27 appropriate stepping pulses from a suitable stepping circuit 29, so that the shift register 27 is stepped to the next state or cycle of serially occurring digits at its outputs, the resulting second 5 serially occurring digits 3, 1, 2, 3, 1 in the Mod 3 system are produced. This second shifted state is indicated as the B state. And by stepping the shift register 27 once again, the third 5 serially occurring digits 2, 3, 1, 2, 3 of "State C" are produced as indicated. Since Mod 3 repeats itself as a 5 digit code on the fourth shift, only three shifting states or cycles are necessary. The stepping circuit 29 may be suitably actuated by a clock pulse source or flip-flop 30.

Figure 5:
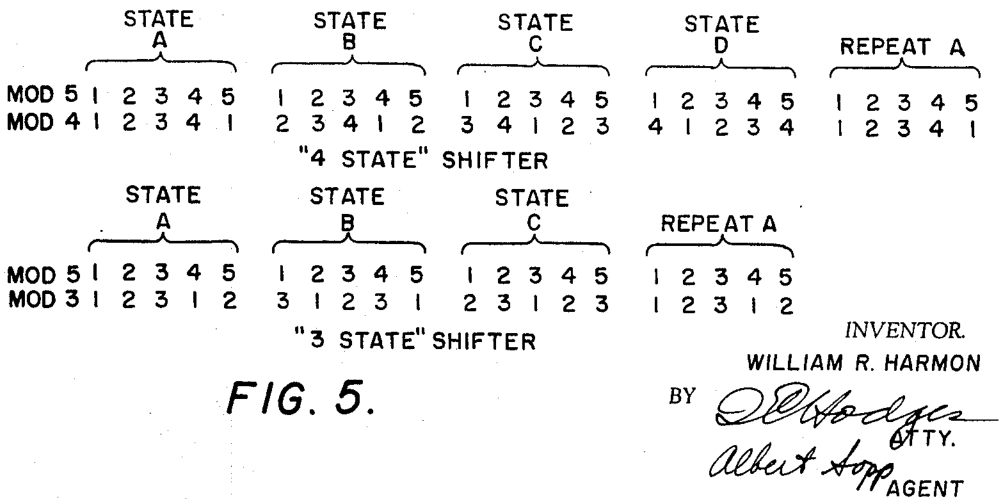

In a similar manner, a shift register 31 and shifter 33 connected to source 30 for the Mod 4 slot filters are provided so that in State A, the Mod 4 code 1, 2, 3, 4, 1 is produced. Since the Mod 4 digits repeat themselves as a 5 digit group on the 5th shift, only 4 shifting states A, B, C, D are required. The respective 5 digit Mod 3 and Mod 4 codes are shown in FIG. 5.

Of course, no shifting in the Mod 5 channel is necessary as the Mod 5 digits repeat themselves in the same serial order cyclically.

It may be seen that the number of shifts for each channel having a modulus less than the largest channel modulus is equal to the number of cycles or states required for the serially occurring digits thereof to be repeated in the same order in relation to the digits of the largest channel modulus.

It is apparent that by shifting the registers 27 and 31 in unison, so that the filter outputs of the respective Mod 3 and Mod 4 channels are gated in successive serial groups of 5 digits, the entire frequency spectrum of 60 cells as represented by 60 Mod 3, 4, 5 codes, may be covered in 12 shifts.

In contrast to the prior art system of FIG. 2, only five AND gates 35, 37, 39, 41, 43 are required in the FIG. 3 system. Each AND gate receives 3 inputs, one from each channel shift register and one from one of the slot filters of the Mod 5 channel so that, when the shift registers are set at State A, the AND gate 35 receives the Mod 3, 4, 5 code 1–1–1; AND gate 37 receives code 2–2–2; AND gate 39 receives code 3–3–3; AND gate 41 receives code 1–4–4; and AND gate 43 receives the code 2–1–5. In State B, the connection, in the shift registers 27 and 31 are shifted so that AND gate 35 receives Mod 3, 4, 5 code 3–2–1; AND gate 37 receives code 1–3–2; AND gate 39 receives code 2–4–3; AND gate 41 receives code 3–1–4; and AND gate 43 receives code 1–2–5. In brief, 12 shifts of the shift register 27 and 31 through their respective states produces all of the 60 discrete code groups in the Mod 3, 4, 5 system.

Assuming a 60 mc. band of interest, when a carrier is intercepted by antenna 11 and is fed to the three Mod channels, there appear at the input ends of the respective Mod filter groups the sideband configurations shown in FIGS. 4*a*, 4*b* and 4*c*. Suppose that the incoming signals are such to produce the Mod 3, 4, 5 code 3–3–3 when the shift registers are in State A. Thus AND gate 39 is enabled. Since the state of the shift registers is known, the incoming carrier is thus known to lie in the third cell of the total of 60 discrete cells defined by code group in the Mod 3, 4, 5 system.

The dwell time of each shift may be controlled by adjusting the pulse repetition rate of the clock pulse source or flip-flop 30, or by providing blocking oscillators between the channel filters and the shift registers.

Consequently during the dwell time of the shift registers 27 and 31, the foregoing signal identified as Mod 3, 4, 5 code 3–3–3 in AND gate 39 is observed. This signal may, of course, be converted to a decimal output in the manner disclosed in U.S. Patent 3,019,975, or by any other suitable means. The converted signal may then be fed to any suitable display or signal handling apparatus for measurement indication thereof.

In subsequent appropriate delay increments the shift registers 27 and 31 are stepped to successive states until they have been shifted 12 times. Suppose, however, that two input carriers are simultaneously intercepted by the antenna 11 and fed into the system. In prior systems this would have resulted in misleading input signal code information as previously pointed out.

However, in the novel system of FIG. 3, these input signals are not confusingly intermingled so as to produce misleading mixed base code information. Suppose one of the two carriers simultaneously present in the system produces an output in the Mod 3, 4, 5 code of 3–3–3 with the shift registers in State A. At that moment only AND gate 39 may be enabled. Since the shift registers 27 and 31 may be shifted within the next microsecond, or less, the possibility of loss of the second carrier from the system is quite remote. However, the second carrier is effectively inhibited during reception of the first carrier because the system has at that moment been shifted to be receptive only to the frequency band in which the first carrier is present. The shift rate may be of the order of about one microsecond or less between adjacent register positions. If the second carrier is still present and lies in a frequency band corresponding to the State B, and said second carrier activates leads corresponding to the code 3–2–1, the AND gate 35, will be enabled. From the synchronization schedule it will be clear that the second carrier occurred at the 11th cell of the entire system as indicated by the Mod 3, 4, 5 code 3–2–1.

It will be understood that instead of the FIG. 2 system employing 60 AND gates having 240 diodes and a like number of resistance elements, the novel arrangement of FIG. 3 requires only 5 AND gates to provide the 60 discrete Mod 3, 4, 5 mixed base codes. The novel system of FIG. 3 is simpler and requires less critical synchronization. These advantages of the FIG. 3 arrangement become even more important when the number of cells in the system is increased to provide higher resolution.

As an illustration, suppose that instead a 60 cell discrimination system, a 4000 cell system is required. If a 4000 cell system were built according to the arrangement of FIG. 2, 4000 AND gates and 16,000 diodes would be necessary. Under the arrangement of FIG. 1, 4000 terminals would have to be commutatively synchronized in each sweep of the system.

But by utilizing the principles of the novel FIG. 3 arrangement, a 4000 cell system can be obtained with only 10 AND gates and 24 shifters in a Mixed Base 7, 8, 9, 10 system.

For purposes of illustration only, and not by way of limitation, there is shown in FIG. 6*a* 360 cell system in the staggered mixed base 6–8–10 notation. One or more information-carrying frequency varying carrier waves are intercepted by an antenna 51 and suitably amplified by one or more traveling wave tube amplifiers 53. The incoming signals are fed to parallel Mod 6, Mod 8 and Mod 10 channels. Assuming for purposes of illustration a 360 mcs. frequency band of interest, a harmonic local oscillator 55 in the Mod 6 channel produces an array of frequency waves separated from each other by 6 mcs. which are fed to a Mod 6 mixer 57. Since the mixer 57 also receives the input carrier, the mixer output is the carrier and an array sidebands separated from the carrier and from each other by 6 mcs.

In a similar manner, in the Mod 8 channel the output of a harmonic local oscillator 59 provides frequencies separated by 8 mcs. for mixing with the incoming carrier in a mixer 61 to produce an output consisting of the carrier and its sideband array with incremental 8 mc. frequency separation. In the Mod 10 channel, the frequencies produced by a harmonic local oscillator 63 are incrementally separated by 10 mcs. and are mixed with the incoming carrier in a mixer 65 to provide a carrier/sideband frequencies 10 mc. incremental separation.

Since a staggered Mod 6, 8, 10 system is being provided, six adjacent 3 mc. slot filters form a Mod 6 filter gamut 67 in the Mod 6 channel. The presence of the carrier or one of its sidebands can occur in only one of said filters at any one time. Therefore, the active filter of the gamut 67 defines a Mod 6 digit representation of the carrier location.

Eight adjacent 3 mc. slot filters form a Mod 8 filter gamut 69. In the same manner as in the Mod 6 channel, the active filter of the bank 69 defines a Mod 8 digit representation of the carrier location.

Ten adjacent 3 mc. slot filters form a Mod 10 filter gamut 71 wherein the presence of the carrier or one sideband in one of the ten slot filters defines a Mod 10 representation of the carrier location.

In order to obtain 1 mc. resolution with only adjacent cell error, it is necessary to determine in which 1/3 cell portion of the Mod channel filters the incoming carrier is present. Therefore according to known principles the filters of the Mod 8 channel are offset or staggered 1 mc. from those of the Mod 6 channel, and the filters of the Mod 10 channel are offset 1 mc. in the same direction from the filters of the Mod 8 channel. The Mod 6, 8, 10 number array of Table III is thus produced.

The outputs of the Mod 6 filter gamut 67 are fed via separate leads as indicated to a 3-state shifter 73. The three state shifter 73 may generate the following family of Mod 6 numbers in its respective states:

| | | |
|---|---|---|
| Mod 10 | 1 2 3 4 5 6 7 8 9 10 | |
| Mod 6 | 1 2 3 4 5 6 1 2 3 4 | (1st cycle) |
| | 5 6 1 2 3 4 5 6 1 2 | (2nd cycle) |
| | 3 4 5 6 1 2 3 4 5 6 | (3rd cycle) |
| | 1 2 (repeating) | |

When the Mod 6 family of numbers is written on a one to one basis with the Mod 10 family, it is seen that there are three categories of Mod 6 numbers of such correspondence, and hence, 3 cycles or states necessary to generate those 3 categories.

In similar fashion, it can be shown there are 4 categories and thus, 4 cycles or states of Mod 8 numbers corresponding to Mod 10:

| | | |
|---|---|---|
| Mod 10 | 1 2 3 4 5 6 7 8 9 10 | |
| Mod 8 | 1 2 3 4 5 6 7 8 1 2 | (1st cycle) |
| | 3 4 5 6 7 8 1 2 3 4 | (2nd cycle) |
| | 5 6 7 8 1 2 3 4 5 6 | (3rd cycle) |
| | 7 8 1 2 3 4 5 6 7 8 | (4th cycle) |
| | 1 2 etc. (repeat) | |

Therefore the outputs of the Mod 8 filter gamut 69 are fed to a 4 state shifter 75 which provides the foregoing family of numbers in its respective states.

Instead of the clock pulse stepping arrangement of FIG. 3, a coarse channel frequency receiver may be employed as an alternative to control the modular shifting in accordance with a broader frequency and in which the incoming signal is present.

The incoming signal is thus also fed to a coarse frequency receiver 77 which employs 12 wide band adjacent slot filters covering the exemplary 360 mcs. frequency band of interest. Thus, each of said 12 slot filters passes a 30 mc. band. The output of the coarse frequency receiver occurs in one of 12 leads 79 from one of the respective filters when the incoming carrier is present therein. This output is fed to an inhibit shift controlling circuit 81 to be described in greater detail in connection with FIG. 8.

The overall function of the inhibit shift control circuit 81 is to control the shifting of the 3 and 4 state shifters 73 and 75 in accordance with incoming signal activity detected in the coarse channel receiver 77. In this manner needless sweeping and shifting through the entire band of interest for signal detection and location is advantageously avoided.

The outputs of the shifters 73 and 75 as controlled by the inhibit control circuit 81 are fed to an AND-logic array 85 (explained in greater detail in connection with FIG. 9). The staggered Mod 6, 8, 10 code representations are then converted to a suitable decimal or binary code by means of a converter 87. Such a converter may be of a type disclosed in U.S. Patent 3,019,975, or of any other suitable type. With appropriate display or readout means, no separate conversion means may be necessary.

Reference is now made to FIG. 7 which illustrates in greater detail a version of the coarse receiver 77 and inhibit shift control circuit 81. To the left in FIG. 7 are depicted the 12 coarse channel filters labeled F1, F2 . . . F12 which divide up the frequency band of interest into 12 bands.

Connectively associated with the coarse channel filters and with the Mod 6 channel are three parallel OR-gates 95, 97 and 99. Four parallel OR-gates 101, 103, 105 and 107 respectively are connectively associated with the Mod 8 channel. The first OR-gate 95 of the Mod 6 group receives inputs from the filter channels 1, 4, 7 and 10 (as indicated in legend within the block indicating OR-gate 95). The second OR-gate 97 of the Mod 6 group receives inputs from channels 2, 5, 8 and 11; the third OR-gate 99 receives inputs from channels 3, 6, 9 and 12.

The OR-gate 101 of the Mod 8 group receives inputs from the coarse filter channels 1, 5 and 9; OR-gate 103 of the Mod 8 group receives inputs from the coarse filter channels 2, 6 and 10. OR-gate 105 receives inputs from coarse filter channels 3, 7 and 11, and OR-gate 107 of the Mod 8 group receives inputs from the coarse filter channels 4, 8 and 12.

The twelve coarse filter channels are also connected directly to the converter 87.

The outputs of the OR-gates 95, 97 and 99 are fed to the Mod 6 shifter, and the OR-gates 101, 103, 105, 107 are connected to the Mod 8 shifter. As an example, when the incoming carrier is present in filter channel 4, an output appears on OR-gate 95 of the Mod 6 group and on OR-gate 107 of the Mod 8 group. Since only one input is necessary to enable any of the OR-gates, both OR-gates 95 and 107 provide inputs for the Mod 6 and Mod 8 shifters respectively.

One version of a Mod 6 shifter is depicted in FIG. 8, it being understood that a Mod 8 shifter may be constructed along lines similar to the Mod 6 shifter. To the left in FIG. 8 are illustrated the six parallel 3 mc. slot filters of the Mod 6 channel labeled F6–1 to F6–6 respectively. Associated with these filters is a group of 18 parallel And-gates 109 arranged in subgroups of three. As indicated in FIG. 8, the first subgroup of three AND-gates of the group 109 are each marked "1." The second subgroup of three AND-gates are each marked "2," and so on, until the sixth subgroup of three AND-gates which are each marked "6." There are three AND-gates for each respective filter. Thus the 3 mc. slot filter F6–1 is connected to provide an input to each of the three subgroup AND-gates marked "1." The 3 mc. slot filter F6–2 is connected to provide an input to each of the AND-gates marked "2," and so on, until the sixth filter F6–6, which is likewise connected to provide an input to each of the subgroup AND-gates marked "6."

The first Mod 6 OR-gate 95 (FIG. 7) is connected via output lead C6–1 to the second or middle AND-gate of each of the AND-gate subgroups. The OR-gate 97 is connected via a lead C6–2 to the first AND-gate of each subgroup of three AND-gates, and the OR-gate 99 is connected via a lead C6–3 to the third AND-gate of each subgroup of three AND-gates.

Associated with the AND-gates of the group 109 are 6 modulus-shifting OR-gates 111 labeled 1–6.

The plurality of OR-gates 111 is connected, OR-gate by OR-gate, to a different AND-gate of every other AND-gate subgroup of the AND-gate group 109.

In the embodiment shown in FIG. 8, the serial order of connection of each of said OR-gates to a different AND-gate is identical for each OR-gate. Thus, each OR-gate is connected to receive three inputs. The OR-gate "1" receives one input from the second or middle AND-gate of the first subgroup, an input from the third AND-gate of the third subgroup, and an input from the 1st AND-gate of the 5th subgroup. The second OR-gate "2" receives inputs respectively from the second or middle AND-gate of the 2nd subgroup; from the third AND-gate of the 4th subgroup, and from the 1st AND-gate of the 6th subgroup. The third OR-gate "3" receives inputs respectively from the 2nd or middle AND-gate of the 3rd subgroups; from the 3rd AND-gate of the 5th subgroup, and from the 1st AND-gate of the 1st subgroup.

The fourth OR-gate "4" receives inputs respectively from the 2nd AND-gate of the 4th subgroup; from the 3rd AND-gate of the 6th subgroup, and from the 1st AND-gate of the 2nd subgroup. The fifth OR-gate "5" receives inputs respectively from the 2nd AND-gate of the 5th subgroup; from the 3rd AND-gate of the 1st subgroup and from the 1st AND-gate of the 3rd subgroup. The 6th OR-gate "6" receives inputs respectively from the 2nd AND-gate of the 6th subgroup; from the 3rd AND-gate of the 2nd subgroup, and from the 1st AND-gate of the 4th subgroup.

The outputs of the OR-gates 111 are labeled $6'_1$–$6'_6$ indicating that the OR-gate group shifts the Mod 6 family of numbers.

If, then, an incoming signal is present in coarse frequency channel 4 thus enabling OR-gate 95, an output appears on lead C6–1. The same incoming signal will also be present in one of the Mod 6 channel filters, for example, filter F6–2 (FIG. 8).

The presence of an output voltage on lead C6–1 may result in the enabling of any of the second or middle AND-gates of the respective subgroups 1–6 in the AND-gate group 109. Therefore it follows that the Mod 6 family of numbers 1, 2, 3, 4, 5, 6, is enabled or placed in a "ready" condition because the respective middle AND-gates of each subgroup are connected respectively to OR-gates 1, 2, 3, 4, 5, 6 of OR-gate group 111.

Consequently the simultaneous presence of the signal from Mod 6 filter F6–2 with an output voltage or lead C6–1 enables only the second or middle AND-gate of subgroup 2, and therefore, the OR-gate "2" of OR-gate group 111.

But if the incoming signal next appears in coarse channel 5, OR-gate 97 is caused to produce an output voltage on lead C6–2. The lead C6–2 "readies" the 1st AND-gate of each subgroup in AND-gate group 109. Thus, the Mod 6 family of numbers 3, 4, 5, 6, 1, 2, is generated, and the appearance of an incoming signal in the same Mod 6 filter F6–2 is fed through the 1st AND-gate of subgroups 2 to the OR-gate "4" of the OR-gate group 111, producing the Mod 6 digit 4.

It will be appreciated that the family of Mod 6 numbers is thus shifted under control of the coarse frequency band position of the incoming carrier so that the Mod 6 channel signals are properly allocated to the correct Mod 6 code for the particular mixed base code location of the incoming carrier in the frequency band of interest. To further illustrate, were the coarse frequency channel 1 activated, then OR gate 95 of the inhibit shift control circuit (FIG. 7) would produce an output voltage on lead C6–1 causing the shifter to generate the Mod 6 number family 1, 2, 3, 4, 5, 6 at AND gates 109. With coarse channel 2 activated, OR gate 97 produces an output on lead C6–2 thus readying Mod 6 number family 3, 4, 5, 6, 1, 2. With coarse channel 3 activated, OR gate 99 produces an output on lead C6–3 thus readying at AND gate group 109 the Mod 6 number family 5, 6, 1, 2, 3, 4.

But only one Mod 6 3 mc. slot filter F6–1 to F6–6 can be active at a time. Thus, only one output may be produced by the OR gates 111. This output is the Mod 6 digit contribution to the particular discrete Mod 6, 8, 10 code providing full incoming signal identification.

The Mod 8 digit contribution is provided in the same manner as the Mod 6 contribution. But instead of the six three-AND gate subgroups provided in conjunction with the Mod 6 channel, the Mod 8 shifter would obviously have eight AND gate subgroups of four AND gates each, the respective subgroup AND gates being serially connected to respective ones of the OR gates 101, 103, 105 and 107 via leads C8–1, C8–2, C8–3 and C8–4. For example, an output voltage on the lead C8–1 would ready one AND gate of each eight subgroups of 4 AND gates to generate the Mod 8 family 1, 2, 3, 4, 5, 6, 7, 8. An output on C8–2 would ready subgroup AND gates to produce the family 3, 4, 5, 6, 7, 8, 1, 2, and so on in the same fashion the Mod 6 number families are readied.

Obviously no shifting is required for the Mod 10 channel because the same digits recur cyclically without change in serial order.

The twelve coarse channel filters F1–F12 are each directly connected to the decimal converter 87 so that the coarse channel activity identifies the active frequency band for conversion purposes. Since in the embodiment herein illustrated the Modulus 10 is employed as one of the mixed bases, the conversion to decimal code is made rather simple. All that need be provided are counting and reset means for identifying the coarse band shift position relative to the Mod 10 cycle.

The shiftable Mod 6 and Mod 8 outputs, as well as the Mod 10 filter bank 71 outputs are fed to an AND logic array circuit 85 shown in detail in FIG. 9. The purpose of the AND logic array circuit is to provide data reduction of the staggered Mod 6, 8, 10 mixed base codes whereby 360 separate cells are identifiably indexed in groups of 30 cells for each coarse channel.

The mixed base digits of the first 30 cells corresponding to the 1st–4th of the 12 coarse channels respectively are illustrated in part in FIG. 9, it being understood that under control of the eight other coarse channels, the remaining 8 groups of 30 mixed base digits are produced to provide the entire 360 cells.

More specifically, the 6 outputs of the Mod 6 three state shifter 73 and the 8 outputs of the Mod 8 four state shifter 75, along with the 10 outputs of the Mod 10 filter gamut 71 are fed in parallel leads to an AND gate array 113 consisting of 30 parallel AND gates. For explanatory convenience, the Mod 6, 8, 10 digits are shown in superimposed staggered notation in the first 4 of the 12 shift positions below each of the 30 AND gates. The AND gates 113 are decimally indexed as cells 1–30.

Obs erving that in the "coarse channel 1" position a Modulo 6 digit of 1 is to be provided at the output of each of the AND gates indexed 1, 2, 3, the output of the 1st OR gate (of the OR gate group 111 of the Mod 6 shifter 73) is connected to feed each of the 1st 3 AND gates 1, 2, 3 of the array 113. Similarly, observing that a Mod 8 digit of 1 is to be provided at AND gates 1 and 2 only, the 1st OR gate of the Mod 8 shifter 77 is connected to AND gates 1 and 2 of the array 113. The first filter of the Mod 10 filter gamut 71 is connected only to the AND gate 1 whereby a Mod 10 digit of 1 is fed thereto.

Since a Mod 8 digit of 2 is to exist at the third index position, the output of the 2nd OR gate of the Mod 8 shifter 77 is fed to the AND gate 3 as well as to the AND gates 4 and 5 which also provide a Mod 8 digit 2 output. A Mod 10 digit 2 is fed to AND gates 2, 3 and 4 from the second filter of filter bank 71 in the Mod 10 channel.

The connections between the Mod 6 and Mod 8 shifters 75 and 73, and between the Mod 10 filter bank 71, and the AND gates of array 113 are carried out in the foregoing described manner so that the appropriate Modulo digits reach the AND gates 1–30 to provide the staggered Mod 6, 8, 10 codes indicated therebelow.

To further illustrate, since the Mod 6 digit of 1 recurs at index points 19, 20 and 21, the 1st OR gate of the group 111 (FIG. 8) is connected to the AND gates 19, 20 and 21 of the array 113. The Mod 8 digit 1 recurs at the index points 24, 25 and 26 of the array 113. Consequently the 1st OR gate of the Mod 8 shifter is connected to AND gates 24, 25 and 26 of the array 113. The Mod 10 digit 1 does not recur until index point 29 and 30. Thus the first filter of the Mod 10 gamut 71 is connected to the AND gates at index points 1, 29 and 30.

At each of the index points 1–30 there is thus provided a cell which produces a unique mixed base output corresponding to an incoming carrier frequency. A resolution of 1 mc. is provided even though the slot Mod channel filters have a 3 mc. band response. This is because each 1/3 filter cell portion of 1 mc. is uniquely described by a mixed base output in the AND logic array of FIG. 9. As an example, although the Mod 6 digit 1 may occur at cells 1, 2, or 3, the fact that there is an output produced by the AND gate at index point 2 means that an incoming signal must have been located in the center 1 mc. portion of the first 3 mc. slot filter of the Mod 6 channel, within the coarse channel 1. The output at the AND gate of index point 2 further means that the incoming signal must have passed through the upper 1 mc. portion of the first 3 mc. slot filter in the Mod 8 channel; and that said signal must have passed through the lower 1 mc. portion of the second 3 mc. slot filter of the Mod 10 channel. Consequently, the resolution is brought down to 1 mc. portions of the 3 mc. slot filters, or 1/3 of each filter bandwidth in each Mod channel.

It is understood that only one digit changes from cell to cell in the staggered or offset mixed base code. Consequently should filter crossover errors occur in the system, only one digit of a cell will be affected, and the resulting erroneous mixed base code will define a cell position adjacent that of the correct cell.

In operation, the occurrence of an incoming signal in one of the coarse frequency filters 77 causes the shifting of the Mod 6 three state shifter 73 and the Mod 8 four state shifter 75 to generate families of numbers corresponding to the particular active one of the twelve coarse panel positions. The incoming signal passing through one filter of the Mod 6 channel passes through one of the enabled AND gates 109 under control of coarse channel information in one of the leads C6–1 to C6–3. The active Modulo 6 channel may or may not be shifted in the OR gates 111. Similar action takes place in the Mod 8 shifter 75 as previously described. It may happen that the Mod 6 channel information is shifted, and the Mod 8 channel information is not shifted, or vice versa, or that both or neither channels are shifted.

In any event, one output is produced by each of the shifters 73 and 75 and is fed, along with the output of one of the Mod 10 filters 71 to the AND logic array 85. If coarse channel 2 is active, then the mixed base output would occur at an AND gate at one of the index points resulting in a mixed base number corresponding to the number array shown adjacent the legend "coarse channel 2" in FIG. 9. With the coarse channel 3 active, the mixed base number produced would correspond to the array shown adjacent the legend "coarse channel 3," and so on.

The presence of two successively incoming carriers in different coarse frequency bands establishes shifting under the respective active coarse channel instructions in the shifters 73 and 75. The system embodied in FIG. 6 affords faster response than that embodied in FIG. 3, regardless of whether staggering or offset is employed, because the FIG. 3 system requires stepping through all of the shift positions to cover the entire band. In the system of FIG. 6, shifting is in accordance with coarse channel activity and is consequently faster.

It is to be understood that the system of FIG. 3 may employ offset of the Mod channel filter gamuts in combination with the clock controlled step-shifting and that the coarse channel controlled system of FIG. 6 need not employ filter offset or staggering. Blocking oscillators or any other suitable channel signal holding means may be employed in both the systems of FIG. 3 and FIG. 6 connected between the Mod channel filters and shifters, and controlled by suitable delay or timing means such as flip-flops in order to control the data reduction rate of incoming signal information.

Obviously many modifications and variations of the present invention are possible in the light of the above teachings. It is therefore to be understood that within the scope of the appended claims the invention may be practiced otherwise than as specifically described.

What is claimed is:

1. In a mixed base receiver having a plurality of parallel receiving channels for receiving at least one variable frequency signal, each channel having a different modulus and having means for producing an array of sideband frequencies related to the incoming signal by increments corresponding to the modulus of said channel, each channel having a modulo gamut of adjacent band slot filters, the number of filters of each modulo gamut being equal in number to the modulus of its respective channel and each filter having a bandwidth such that only one filter of each said gamut may be active in response to the array of sidebands and the incoming signal, an improved data reducing system for said receiver comprising:

changeable interconnection means in each of those channels the modulus of each of which is less than the largest channel modulus, for receiving an input from each filter of the modulo filter gamut;

each of said interconnection means including means providing separate outputs equal in number to the largest channel modulus of the receiver whereby digits related to the modulus of each said channel are serially repeatable to the extent of the largest channel modulus at said outputs;

control means connected to each said interconnection means for effectively changing the connections between the inputs and outputs thereof whereby a family of serial digits corresponding to each respective channel modulus may be enabled at the outputs of each said interconnection means in digit groups of which the number of digits in each group is equal to the largest channel modulus;

a plurality of AND gates equal in number to the largest channel modulus; and connection means connecting each AND gate of said plurality of AND gates to a different one of the outputs of said interconnection means and to a different one of the filters in the largest modulus channel in serial order of respective channel modulo digits.

2. The combination according to claim 1 but further characterized by said control means comprising stepping means for shifting the interconnections of said interconnection means to one of a plurality of different states, the outputs of each state corresponding to a modulo digit family.

3. The combination according to claim 1 but further characterized by said control means comprising:

a plurality of wide band slot filters, each filter of said plurality having a bandwidth exclusive of the bandwidths of the other filters of said plurality, and said plurality of filters being responsive to frequencies of incoming signals intercepted by said mixed base receiver; and shift control means for each of said interconnection means responsive to active ones of said plurality of wide band slot filters for changing the interconnections of said interconnection means.

4. The combination according to claim 1 but further comprising code conversion means connected to said AND gates and to said control means.

5. In a mixed base receiver having a plurality of parallel receiving channels for receiving at least one variable frequency signal, each channel having a different modulus and having means for producing an array of sideband frequencies related to the incoming signal by increments corresponding to the modulus of said channel, each channel having a modulo gamut of adjacent band slot filters, the number of filters of each modulo gamut being equal in number to the modulus of its respective channel and the bandwidth of each filter of each said channel modulo gamut of filters being equal to the product of the bandwidth resolution desired and the total number of modulo channels in the mixed base receiver, and further characterized by the respective channel modulo filter gamuts being offset or staggered from each other by a bandwidth equal to the desired resolution bandwidth of the mixed base receiver, an improved data reducing system for said receiver comprising:

changeable interconnection means in each of only those channels the modulus of which is less than the largest channel modulus, for receiving from each filter of its corresponding modulo filter gamut a plurality of identical inputs, said plurality being equal to the number of families of digits of the modulus serially capable of being generated in non-repetitive one to one relation to the digits of the largest modulus of the mixed base receiver;

each of said changeable interconnection means having a plurality of outputs equal in number to the modulus of its respective channel and connected to said input means;

control means connected to each of said interconnection means for changing connections between the inputs and outputs in said interconnection means whereby a family of numbers corresponding to each respective channel modulus is enabled at the outputs of each said interconnection means;

an array of AND gates equal in number to the product of the largest channel modulus and the number of different modulo channels of the system; and means connecting the AND gates of said array with the outputs of said interconnection means and the filter gamut of the largest modulo channel whereby each AND gate receives a number of inputs equal to the total number of modulo channels of the system and in serial relation to modulo digits of each channel as offset or staggered.

6. The combination according to claim 5 but further characterized by said control means comprising stepping means for shifting the interconnections of said interconnection means to successive interconnection states.

7. The combination according to claim 5 but further characterized by said control means comprising:

a plurality of wide band slot filters, each filter of said plurality having a bandwidth exclusive of the bandwidths of the other filters of said plurality, and said plurality of filters being responsive to frequencies of signals intercepted by said mixed base receiver; and shift control means for each of said interconnection means responsive to active ones of said plurality of wide band slot filters for changing the interconnection of said interconnection means.

8. In a mixed base receiver having a plurality of parallel receiving channels for receiving at least one variable frequency signal, each channel having a different modulus and having means for producing an array of sideband frequencies related to the incoming signal by increments corresponding to the modulus of said channel, each channel having a modulo gamut of adjacent band slot filters, the number of filters of each modulo gamut being equal in number to the modulus of its respective channel and the bandwidth of each filter of each said channed modulo gamut of filters being equal to the product of the bandwidth resolution desired and the total number of modulo channels in the mixed base receiver, and further characterized by the respective channel modulo filter gamuts being offset or staggered from each other by a bandwidth equal to the desired resolution bandwidth of the mixed base receiver, an improved data reducing system for said receiver comprising:

changeable interconnection means in each of only those channels the modulus of which is less than the largest channel modulus;

each of said changeable interconnection means having a plurality of AND gates arranged in a number of subgroups equal to the channel modulus, each subgroup consisting of a plurality of AND gates equal in number to the number of families of digits of the modulus capable of being generated in non-repetitive one to one relation to the serially expanded digits of the largest channel modulus;

each channel having means connecting each of respective different filters of the gamut thereof to a subgroup of said plurality of AND gates;

control means providing a plurality of respectively different control conditions corresponding to respectively different families of digits;

a plurality of leads for each channel, one lead for each control condition, connecting said control means to said plurality of AND gates whereby each lead is connected to an AND gate of each subgroup thereby establishing a different control condition for each AND gate of a subgroup and the same control condition for a correspondingly identical AND gate in each subgroup;

a plurality of OR gates in each channel equal in number to the modulus of the channel;

means connecting the plurality of OR gates, OR gate by OR gate, to a correspondingly different AND gate of every other AND gate subgroup of said plurality of AND gates, the serial order of connection of each of said OR gates to a correspondingly different AND gate being identical for each OR gate;

an array of AND gates equal in number to the product of the largest channel modulus and the number of receiver channels; and means connecting said array, in serial order AND gate by AND gate, to a serially corresponding OR gate of each channel having a modulus less than the largest channel modulus, and to a serially corresponding filter of the gamut thereof in the channel having the largest modulus, the serial relation of connections being staggered by one digit from channel to channel whereby the AND gates of said array may thereby produce a staggered array of mixed base outputs corresponding to the offset of said respective channel filter gamuts.

9. The data reducing system according to claim 8 but further comprising:

code conversion means connected to said array of AND gates and to control means.

10. The system according to claim 8 but further characterized by said control means comprising a plurality of wide band adjacent slot filters, each filter being connected to one of said plurality of leads.

11. The system according to claim 8 but further characterized by said control means comprising:

a source of periodic pulses; and stepping means responsive to said source of pulses for providing control pulses in said plurality of leads.

No references cited.

MAYNARD R. WILBUR, *Primary Examiner.*

W. J. KOPACZ, *Assistant Examiner.*